United States Patent [19]
Brattberg

[11] 3,963,213
[45] June 15, 1976

[54] BUTTERFLY VALVE

[75] Inventor: Axel Wilhelm Brattberg, Linkoping, Sweden

[73] Assignee: Saab-Scania Aktiebolag, Linkoping, Sweden

[22] Filed: Oct. 11, 1974

[21] Appl. No.: 514,028

[30] Foreign Application Priority Data
Oct. 15, 1973 Sweden .............................. 7313937

[52] U.S. Cl. ................................ 251/306; 251/162; 251/192
[51] Int. Cl.² .......................................... F16K 1/22
[58] Field of Search ........... 251/305, 306, 307, 308, 251/304, 162, 192

[56] References Cited
UNITED STATES PATENTS

| | | | |
|---|---|---|---|
| 3,393,697 | 7/1968 | Fawkes | 251/307 |
| 3,471,120 | 10/1969 | Geiselman | 251/306 |
| 3,583,670 | 6/1971 | Manske | 251/307 |
| 3,809,361 | 5/1974 | Pfundstein et al. | 251/305 |

Primary Examiner—William R. Cline
Assistant Examiner—H. Jay Spiegel

[57] ABSTRACT

The valve seat of a butterfly valve is defined by a circular edge on a land-like radially inward projection in the valve housing, lying in a plane normal to the axis of the fluid passage through the seat. The valve member rotates about a pivot axis which is transverse to the passage axis, spaced in one direction from it and spaced to one side of said plane. The valve member has a peripheral sealing surface corresponding to the frustum of an oblique circular cone symmetrical to a plane containing the passage axis and normal to the pivot axis, which cone (considering the valve member in closed position) has its apex at the other side of the valve seat plane and spaced in said one direction from the passage axis.

6 Claims, 4 Drawing Figures

BUTTERFLY VALVE

This invention relates to so-called butterfly valves, of the type comprising a housing in which there is an annular valve seat and a more or less disc-like valve member which rotates flat-wise towards and from a closed position sealingly engaging the valve seat all around the same; and the invention is more particularly concerned with the configurations of the sealing surfaces of the valve member and the valve seat in such a valve.

In general, a butterfly valve of the type to which the invention relates has a more or less tubular housing that has in its interior a radially inwardly projecting circumferential landlike projection that defines a valve seat. The housing defines a passage for fluid medium that extends through the valve seat; and the valve seat, which is usually spaced inwardly from both ends of the valve housing, lies generally in a plane that is normal or nearly normal to the passage axis.

The valve member of a butterfly valve is more or less disc-like or dish-like. It rotates flatwise about an axis which is transverse to the passage axis and which is spaced from the plane of the valve seat. In its fully open position the valve member is oriented generally parallel to the passage axis, so as to present itself edge-on to fluid flowing through the valve housing. In its closed position the valve member should of course have sealing engagement with the valve seat all around the same.

To be satisfactory, a butterfly valve must meet several important requirements, and heretofore the optimum fulfillment of any one of these requirements has always seemed to be incompatible with optimum fulfillment of one or more of the others.

An important feature of a butterfly valve is its resistance value, which is a measure of the pressure drop across the valve when it is fully open and which should of course be as small as possible. The resistance value Z of a butterfly valve is normally given by:

$$Z = \left[ \left( \frac{d_i}{d_{min}} \right)^2 - 1 \right]^2$$

where $d_i$ is the internal diameter of the pipe or ducting in which the valve is connected (normally, the diameter of the passage at the connecting ends of the valve housing), and $d_{min}$ is the internal diameter of the valve housing in that portion thereof at which the passage therethrough has its narrowest section (normally, at the seat opening).

It will be evident that the magnitude of Z is greatly dependent upon the value of $d_{min}$ in relation to $d_i$; hence any widening of the narrowest section of a given valve will have a favorable effect upon the resistance of the valve. This is to say that the seat should be so formed as to have the least possible radial extent all around the fluid passage through the valve housing.

Obviously a butterfly valve should, when closed, prevent any flow of fluid through the valve seat, and should be capable of maintaining a good seal between the valve member and the seat even after numerous opening and closing movements of the valve member. Nevertheless, it is undesirable for the annular valve seat to have a relatively wide sealing surface in order to obtain the desired seal, for if it does, then the land or projection in the valve housing which defines that sealing surface must necessarily project radially into the fluid passage a substantial distance, impeding the flow of fluid through the valve and causing the resistance value of the valve to be high.

It is also important that a butterfly valve be capable of economical manufacture, so that desirable performance characteristics do not have to be purchased at a heavy cost penalty.

In order to achieve good sealing, it has heretofore been proposed that the annular sealing surface of the valve seat should have the form of the frustum of a cone that has its axis inclined to the axis of the fluid passage. In this way, as the valve member was rotated into coplanar relationship with the valve seat, the geometrical relationship between the sealing surfaces was such as to produce a secure seal and to effect a tightening of the sealing engagement, all around the sealing surfaces, in consequence of any rotation of the valve member that tended to carry it beyond such coplanar relationship.

In German Pat. No. 1,198,630, published Aug. 12, 1965, there is a disclosure of a valve in which the annular seat surface is in the form of the frustum of a right cone that has its axis inclined to the axis of the fluid passage and hence oblique to the plane of the valve seat. At substantially every point around it, therefore, the annular seat surface was inclined to the axis of the fluid passage, obliquely facing that axis and the axis about which the valve member rotated. Obviously the valve seat surface was not circular as viewed along the passage axis but was, instead, elliptical. The valve member likewise had to have an elliptical outline. The elliptical shape of the valve member obviously made it more costly and difficult to manufacture than an equivalent circular one, but machining of the valve seat was especially difficult and complicated, so that such a valve tended to be very expensive.

The practical difficulties involved in producing the valve seat in the valve of that German patent are explained in Dutch Pat. Application No. 7305162, filed Apr. 12, 1973, which disclosed a butterfly valve having its seat surface in the form of the frustum of an oblique circular cone, that is, a cone having a circular base and having its axis inclined to its base. With this arrangement the valve member was circular and the seat surface was also circular on any plane through it that was normal to the passage axis. The seat in the valve proposed by the Dutch patent application was somewhat easier to machine than that of the German patent, but it still posed manufacturing problems. In both cases, rather specialized tooling was required for machining the seat, to provide for support of a workpiece and to enable relative axial and lateral motions between the workpiece and a cutting tool to be accurately controlled and coordinated relative to one another and to rotation of the cutting tool.

The fact that the seat had to be machined inside the relatively heavy and bulky housing further complicated the tooling and the operations that were required for accomplishing the machining. In cases where the seat had to be made of a hard metal alloy, such as Stellite, it was formed on a ring of such material that was welded to an undersurface in the housing that had the same conical shape as the finished seating surface. After the ring of hard metal was welded in place, its inner surface was worked to its final form. These operations were obviously slow, difficult and costly.

A further problem arose when such an obliquely conical seat was in a stainless steel valve housing, owing to the tendency of stainless steel to warp when heated. As the valve was welded to a pipe during its installation, the heat applied to the valve housing resulted in a permanent deformation of its wall that was often of sufficient magnitude to twist the conical valve seat surface or throw it out of round, thereby preventing the valve member from closing completely, especially if the valve member was made of metal. Heretofore the only solution proposed for this problem has been to extend the valve housing at both ends thereof by welding tubular end pieces to it before machining the sealing surface of the valve seat.

Even if the costs and difficulties of machining such conical valve seat surfaces could be regarded as acceptable for butterfly valves intended for some applications, in order to gain the superior sealing obtained with them, such butterfly valves tended to have an unsatisfactorily high resistance value. In such prior valves, the annular sealing surface had to have a high degree of eccentricity, so that at one side of the seat its surface lay at a substantially large angle to the passage axis; and because that surface had to be relatively wide, it necessarily projected radially into the flow passage to a substantial extent. The restriction thus presented to flow of fluid through the valve housing was aggravated by the circumstance that the radially inner edge of the seat surface was necessarily a rather sharp one that faced in the direction of fluid flow and thereby gave rise to turbulence in the stream flowing through the valve seat.

In general, it is an object of the present invention to provide a butterfly valve which has the advantages afforded by the above discussed prior valve constructions with respect to good sealing between the valve member and the valve seat, but which does not have their disadvantages and which, in particular, has a substantially lower resistance value and can be manufactured more easily and inexpensively.

More specifically, it is an object of this invention to provide a butterfly valve wherein one of the cooperating sealing surfaces is in the form of the frustum of an oblique cone, and wherein the machining of the valve seat does not involve complicated or unusual tooling or operations.

In this connection it is another specific object of this invention to provide a butterfly valve wherein the valve seat can be formed of an elastic material, so that any warping or twisting of the valve housing is accommodated without leakage past the valve member when the same is in its closed position.

Another specific object of the invention is to provide a butterfly valve having a seat which is defined by a land or circumferential radially inward projection from the wall of the fluid passage that is of small radial extent, so as to present minimal restriction to fluid flow through the housing, and wherein the sealing surface on the seat can likewise be of small radial extent, can be circular and concentric to the passage axis, and can be rounded so as to have little or no tendency to induce turbulence in the fluid stream flowing therethrough.

In general the invention consists in the provision of a butterfly valve having a housing which defines a seat that lies substantially in a plane and also defines a fluid passage which extends through the seat and which has an axis normal to said plane, the seat being defined by a land-like radially inward projection in the housing which extends circumferentially around it and the sealing surface on said seat being defined by an annular radially inner edge portion on said projection that is circular and concentric to the passage axis, the butterfly valve also comprising a valve member in the housing that is rotatable between closed and open positions about a pivot axis which is spaced in one direction from the passage axis and which is parallel to the plane of the seat and spaced to one side thereof, the valve member having a peripheral sealing surface which corresponds to the frustum of an oblique circular cone that has its plane of symmetry normal to the pivot axis and containing the passage axis, said cone, considering the valve member in its closed position, having its circular base normal to the passage axis and having its apex at the other side of the plane of the seat and spaced in said one direction from the passage axis.

With the foregoing observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of embodiments of the invention constructed according to the best modes so far devised for the practical application of the principles thereof, and in which.

Figure 1:
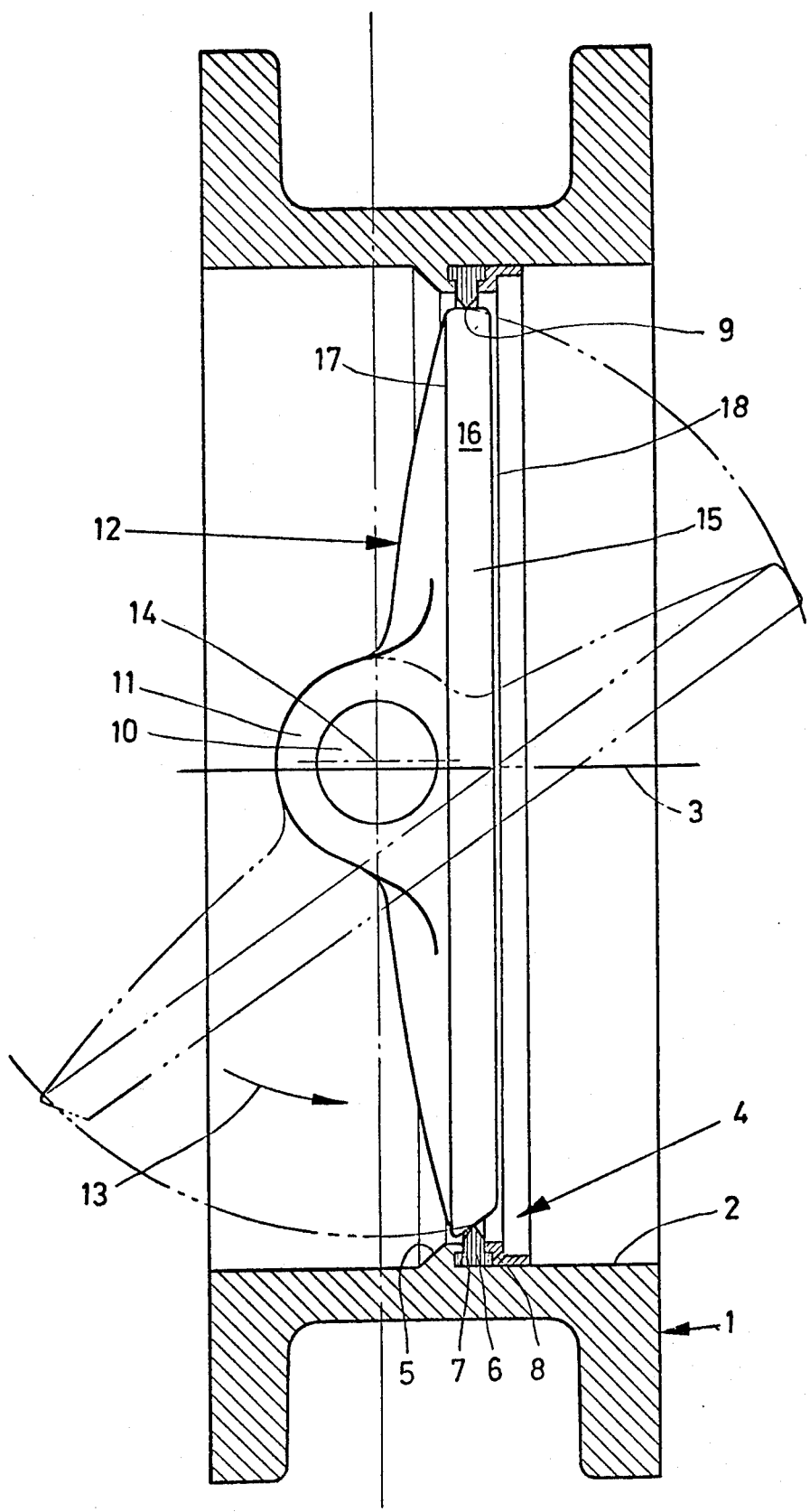
FIG. 1 is a view in longitudinal section of a butterfly valve which embodies the principles of the present invention, the view being taken on the plane of symmetry of the valve member and thus also on the axis of the valve housing.
Figure 2:
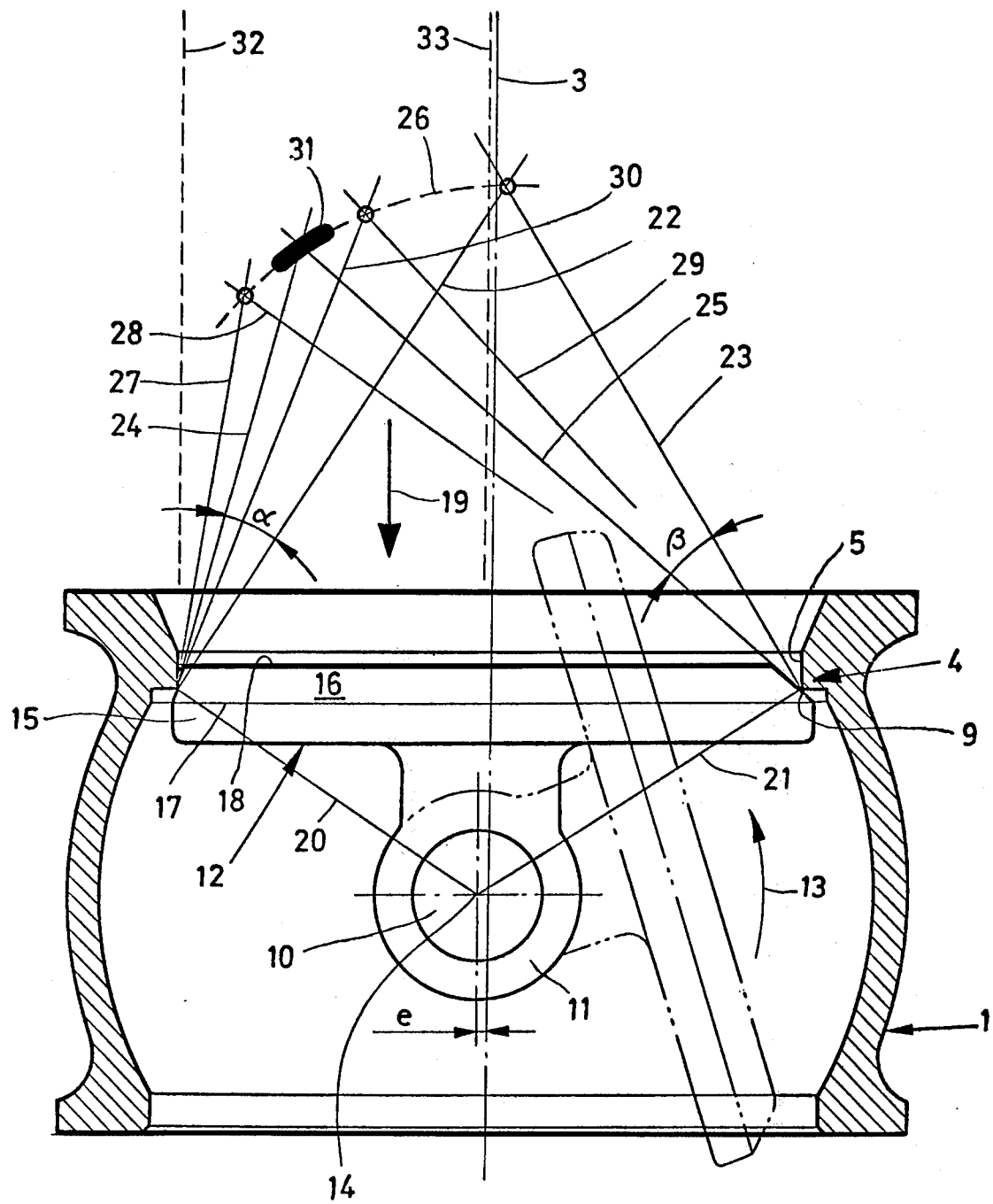
FIG. 2 is a view in longitudinal section of another embodiment of the butterfly valve of this invention, particularly adapted for use as a control valve, the section again being taken on the plane of symmetry of the valve member.
Figure 3:
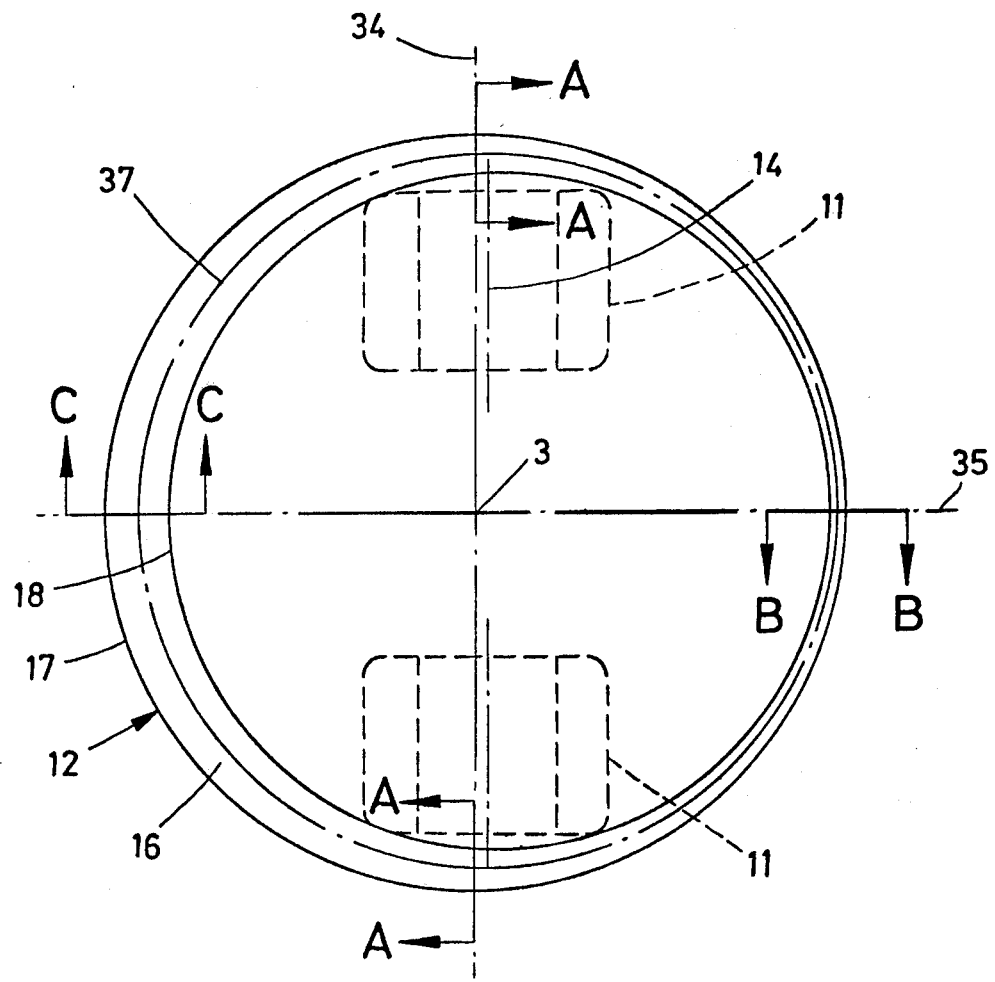
Figure 4:
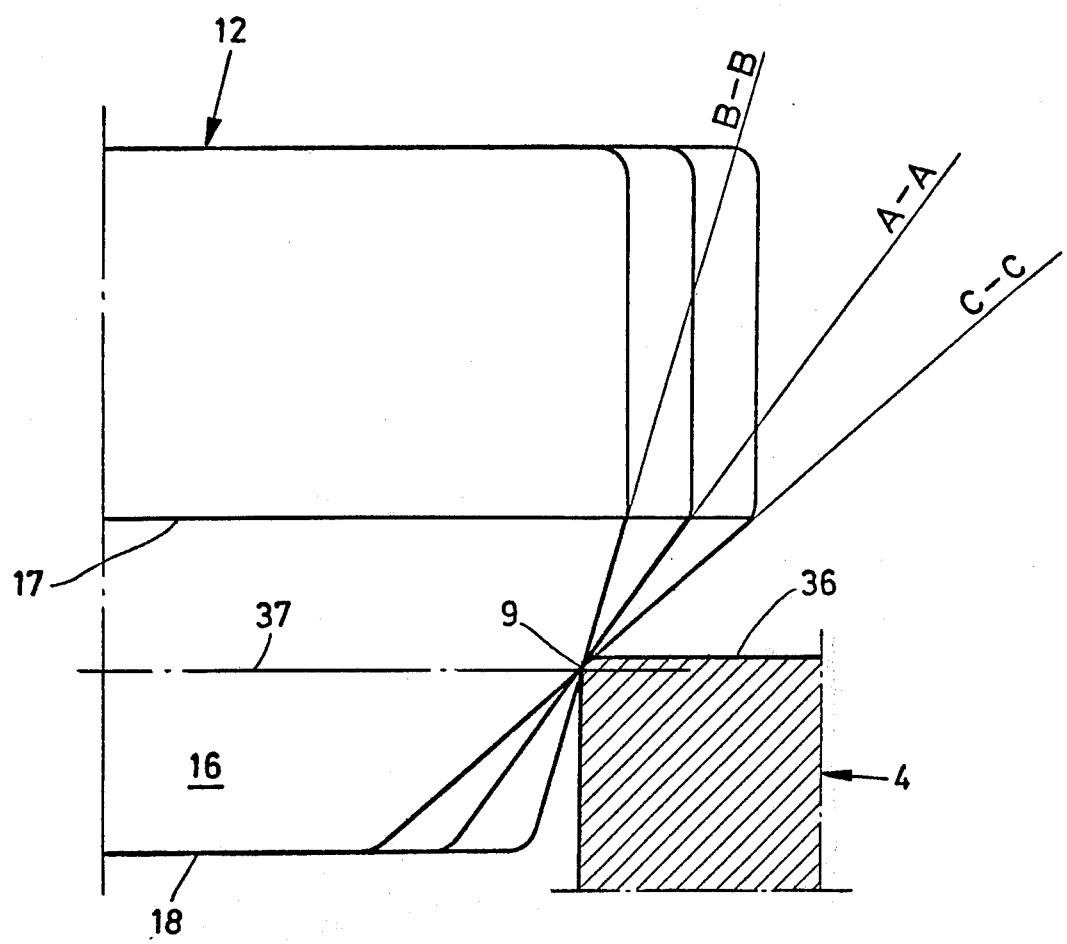

FIG. 3 is a plan view of the valve member of the butterfly valve illustrated in FIGS. 1 or 2, seen from the side thereof opposite to the one at which its pivot axis is located; and FIG. 4 is a composite fragmentary sectional view, presenting sections taken on the planes of the lines A—A, B—B and C—C in FIG. 3, to enable comparative study to be made of the profile of the valve member at each of three different points around its circumference.

Referring now to the accompanying drawings, and considering first the embodiment of the butterfly valve of this invention that is illustrated in FIG. 1, the numeral 1 designates generally a substantially tubular valve housing, the inner surface 2 of which defines a flow passage and is concentric to an axis 3 that extends in the direction of fluid flow.

Inside the housing, axially spaced from both ends of it, is a valve seat designated generally by 4, defined in this case by a ring 6 of a relatively soft, elastic material such as rubber, polytetrafluorethylene (Teflon) or the like. The seat ring 6 has a T-shaped cross-section and is axially confined between a circumferential land 5 in the interior of the valve housing, illustrated as being formed integrally with the housing, and a generally Z-shaped retaining ring 8 which is attached to the interior of the housing in any suitable manner. One end of the cross-member portion of the T-shaped valve seat ring is engaged in an axially opening groove 7 in the land 5, its other end under the retaining ring 8. The valve seat ring 6 projects radially inwardly beyond the land 5 and the retaining ring 8, but it will be observed that these several members are all of relatively small radial extent so that they do not materially restrict the passage through the valve housing and therefore offer little resistance to flow of fluid through it. In fact, it might be mentioned at this point that the resistance value Z for a value of this invention is on the order of one-half of that of a comparable valve constructed in accordance with the above discussed prior art.

The valve seat ring 6 tapers radially inwardly to an edge 9 that can be rounded on a small radius. The edge 9, which defines the narrowest diameter of the fluid passage through the housing, is circular as viewed along the passage axis 3 and is concentric to that axis as well as lying in a plane normal to that axis, or nearly normal to it.

As with prior butterfly valves, the valve member 12 in the housing is substantially disc-like and is pivoted for flatwise rotation on a pair of coaxial pins 10 that are journaled in the housing. The pins 10 are non-rotatably secured in bosses or lugs 11 on the rear face of the valve member. As is conventional (and therefore not shown) one of the pins 10 projects axially beyond the exterior of the housing to be connected with a suitable actuator by which the valve member can be rotated through about 90°, between open and closed positions. When fully open the valve member is substantially in edgewise alignment with fluid flow through the interior of the valve body. It rotates towards its closed position in the direction denoted by the arrow 13, and when in its closed position, in which it is shown in full lines, the valve member sealingly engages the valve seat all around the same.

The pivot axis about which the valve member rotates, and which is denoted by 14, extends parallel to the plane that contains the valve seat and is therefore transverse to the passage axis 3. The pivot axis is spaced to one side of the plane of the valve seat plane, and it is also spaced a small distance in one direction from the passage axis 3.

According to the present invention the sealing surface 15 on the valve member 12, which engages the edge 9 of the valve seat when the valve is closed, is a peripheral surface 16 thereon that corresponds to the frustum of an oblique circular cone, that is, a cone which has a circular base and which has its axis oblique to its base. The curved surface of such a cone defines a circle at every plane through it that is parallel to its base, but the axis of the cone, which is a straight line that passes through the centers of those circles, is inclined to those planes instead of being normal to them.

The oblique circular cone to which the sealing surface 16 corresponds has a plane of symmetry that is normal to the pivot axis 14 and contains the passage axis 3. Having regard to the valve member in its closed position, the apex of that cone is at the opposite side of the valve seat plane from the pivot axis 14 and is spaced from the passage axis 3 in the same direction as the pivot axis. It will be apparent that the edges 17 and 18 of the peripheral surface 16 correspond to the intersections between the curved surface of the aforesaid cone and a pair of planes parallel to its base, and therefore both of those edges are truly circular, as is any section of the valve member that is taken on a plane parallel to those edges.

It will now be evident that the machining of the valve of this invention is much less costly and complicated than the machining of corresponding prior valves. The interior of the valve housing can be finished with very simple and conventional machines and tooling, inasmuch as all portions of its interior are surfaces of revolution concentric to the axis 3. The more complicated machining is performed on the valve member, which, however, is substantially smaller and lighter than the valve housing, and therefore much more readily manipulated. Moreover, the machining of the valve member, in addition to its being performed upon an exterior surface rather than a less accessible interior one, inherently requires, by reason of its geometry, less complicated tooling and machining procedures than the conical-section sealing surfaces of prior valves. For the same reason, it is a simple matter to provide the butterfly valve of this invention with a hard metal sealing surface, which would be applied to the valve member 12.

With the exception of points on a plane which is normal to the plane of symmetry and contains the passage axis 3, the sealing surface 16 on the valve member makes wedging engagement with the sealing edge 9 of the valve seat as the valve member is swung through the final stages of its closing movement. Consequently any wear that might occur on the seat is compensated for by swinging the valve member to a closed position in which its edges 17 and 18 are slightly beyond parallel relationship with the edge 9 on the seat ring 6; and if the seat ring has worn somewhat unevenly, such wear is compensated for by the deforming force exerted upon that ring through the wedging action.

The form of the valve of this invention that is illustrated in FIG. 2 is particularly intended for use as a control valve, as for example in a processing operation in which the fluid flowing through the valve may have solid particles suspended in it, such as fibres. For such applications it has been found advantageous to provide the valve member 12 with a high degree of eccentricity, that is, to locate its pivot axis 14 at a relatively large distance from the plane of the seat 9, so that when the valve is open, its valve member is located at a distance from the passage axis 3 and thus at one side of the fluid passage through the valve housing 1. To accommodate the valve member in its open position, the interior of the housing should have a relatively large radial extension at the zone of the pivot axis 14, at least at the side of the housing at which the valve member is located when open. As shown in FIG. 2 such radial extension is provided by rounding the interior of the housing to substantially a spherical segment having its center at the point on the passage axis that is nearest the pivot axis 14. Thus, as with the FIG. 1 embodiment, the interior of the housing can be formed as a surface of revolution concentric to the passage axis 3 at every point along that axis. Consistently with the substantially eccentric mounting of the valve member and the radial extension of the housing interior in the neighborhood of the pivot axis, the direction of fluid flow through the valve housing should be as denoted by the arrow 19, to minimize the valve opening moment and the cavitational tendencies of the medium.

To avoid erosion danger, the parts of a control valve on which its sealing surfaces are formed can be entirely of metal. In this case, therefore, the land-like radially inward projection 5 in the valve body that comprises the valve seat 4 can be formed as an integral part of the housing. Alternatively, the valve seat could be somewhat like that illustrated in FIG. 1, formed as a separate ring, but of a material having slightly greater elasticity than metal so that an optimal seal can be obtained notwithstanding any minor surface defects that might be present in the sealing means. Irrespective of the construction of the seat, however, it must be defined by an edge or edge-like rounded surface 9 that is radially innermost on the seat defining portion of the valve housing structure.

FIG. 2 illustrates certain geometrical conditions that apply to the sealing surface 16 of the valve member, which, again, corresponds to a frustum of an oblique circular cone. Throughout the following explanation, the valve member will be assumed to be in its closed position. Again, the apex of the imaginary cone that defines the sealing surface 16 is at the opposite side of the plane of the valve seat from the pivot axis 14, and the plane of symmetry of that cone is normal to the pivot axis 14 and contains the passage axis 3.

In that plane of symmetry two imaginary reference lines 20 and 21 can be drawn through the pivot axis 14 and the points of contact between the sealing surface 16 on the valve member and the edge 9 that comprises the valve seat. It will be apparent that for very small angles of rotation of the valve member to and from its closed position, its peripheral surface 16, at the points of contact just mentioned, moves in directions defined by normals 22 and 23 to the respective reference lines 20 and 21 through those points of contact. Of course the normals 22 and 23 also lie in the plane of symmetry of the cone. The intersection of that same plane of symmetry with the curved surface of the cone defines the lines 24 and 25, which are generatrices of the cone that pass through the above mentioned points of contact.

It will be apparent that the normals 22 and 23 define friction angles to the plane of the edges 17 and 18; that is, if the cone corresponding to the sealing surface 16 were of such configuration that its generatrices in its plane of symmetry coincided with the normals 22 and 23, the sealing surface 16 would have only rubbing or frictional contact with the seat surface 9 through small angles of rotation of the valve member near its closed position. However, there is a wedging angle $\alpha$ between the normal 22 and the generatrix 24, and a similar wedging angle $\beta$ between the normal 23 and the generatrix 25, so that in fact rotation of the valve member through small angles in its closing direction forces the sealing surface 16 more and more tightly against the seat 9. Preferably the wedge angles $\alpha$ and $\beta$ are equal to one another and are greater than the corresponding friction angles by between about 16° and 20°.

If, as is preferred, the wedge angles at opposite sides of the plane of symmetry of the cone are equal, that is, $\alpha = \beta$ then the sealing forces act symmetrically, not only on that plane of symmetry but also on every plane parallel to it, and no lateral forces are imposed upon the bearings for the valve member pins 10.

The preferred wedge angle is 18° and is denoted in FIG. 2 by the generatrices 24 and 25 which are at that angle to the respective normals 22 and 23. A wedge angle of 24° is denoted by the illustrated generatrices 27 and 28, and of 12° by generatrices 29 and 30.

The intersections of the normals 22 and 23 and of the several pairs of generatrices 24-25, 27-28, 29-30, define an evolvement 26 on which lies the apex of the cone. The preferred locus of the apex of the cone is designated by 31. Assuming that the pivot axis 14 remains fixed in its illustrated position with respect to the plane of the valve seat, then if the cone apex lies axially outwardly of the evolvement 26, the wedge angle of the left-hand tangential point will be greater than that of the right hand one, while the opposite relationship between wedge angles will exist if the cone apex is moved axially inwardly of the evolvement.

The apex of the cone should, in any case, be at least as far from the passage axis 3 as is the pivot axis 14, and should be on the same side of the passage axis as the pivot axis, all as denoted by the line 33 in FIG. 2; and the maximum permissible distance between the cone apex and the passage axis is equal to the radius of the seat 9, as denoted by line 32. If the cone apex lies between the lines 32 and 33, then on the one hand adequate sealing pressure can be obtained without the need for exerting an excessively large closing moment upon the valve member, and on the other hand jamming of the valve member is prevented. Such jamming is liable to occur if the wedge angles $\alpha$ and $\beta$ are small and the sealing surface 16 approaches correspondence to the frustum of a right circular cone.

If the wedge angles were small and the sealing surface 16 were, at the same time, relatively wide, the valve member would not be rotatable to a fully open position; for in that case the edge 18 of the sealing surface would not clear the seat surface 9 as the valve member was rotated, but would strike the seat surface at two positions located to the right of the passage axis 3. If, as shown in the drawing, the cone apex is spaced from the passage axis in the same direction as the pivot axis, such restriction of opening movement is avoided; and by suitable selection of the lateral eccentricity $e$ (i.e., the distance between the passage axis and the pivot axis), it is possible, even in the case of small wedge angles and a wide peripheral surface 16 on the valve member, to ensure that the valve member can be swung through a full 90° to an open position in which its influence upon the resistance value of the valve is as small as possible.

The manner in which sealing engagement is effected between the cooperating sealing surfaces 9 and 16 of the embodiment illustrated in FIG. 2 can be seen from FIGS. 3 and 4, considered together. In a plane 34 that contains the passage axis 3 and is normal to the plane of symmetry 35, the peripheral portions of the valve member at both sides of the passage axis engage the edge 9 of the seat opening at an angle shown in FIG. 4 by the line A—A. Following the sealing surface circumferentially around the valve member from those points, in the direction toward and beyond the pivot axis, the angle between the sealing surface 16 and the seat plane 36 steadily decreases until the profile in the plane of symmetry of the valve member becomes that denoted by the profile line B—B. Following around in the opposite direction from the points A—A, the angle between the sealing surface 16 and the seat plane 36 becomes increasingly steep until the section C—C is reached. The angular difference between the respective profile lines becomes greater with increasing obliqueness of the cone, that is, with increasing distance between the apex of the cone and the passage axis 3. Because of that angular difference for any particular case, the seat surface 9 should be narrow and rounded, so that sealing engagement is obtained around a circular line 37 that preferably constitutes the average diameter of the frustoconical sealing surface 16.

From the foregoing description taken with the accompanying drawings, it will be apparent that this invention provides a butterfly valve which can be manufactured easily and inexpensively and which provides a good seal between its valve member and its valve seat, even after the sealing surfaces have sustained some wear or erosion, has a low resistance value, does not require that excessively high moments be exerted upon its valve member for opening and closing the same, and does not impose lateral forces upon the bearings in which its valve member rotates.

Those skilled in the art will appreciate that the invention can be embodied in forms other than as herein disclosed for purposes of illustration.

The invention is defined by the following claims:

1. A butterfly valve comprising a valve housing defining a valve seat which lies in a plane and a fluid passage which extends through the valve seat and which has an axis normal to said plane, said butterfly valve also comprising a valve member in said housing that is rotatable back and forth about a pivot axis which is spaced in one direction from said passage axis and is parallel to said plane and spaced to one side thereof, such rotation of the valve member carrying it between a closed position in which it sealingly engages the valve seat all around the same and an open position in which the valve member is oriented substantially edgewise to the valve seat, said butterfly valve being characterized by:
   A. said valve seat being provided by a radially inner edge on land-like means in the housing, which edge is circular and concentric to the passage axis;
   B. said valve member having a peripheral sealing surface cooperable with the valve seat, which surface extends axially from one to the other of a pair of parallel planes and corresponds to the frustum of an oblique circular cone symmetrical to a plane which is normal to the pivot axis and which contains the passage axis, said cone, considering the valve member in its closed position, having its circular base normal to the passage axis and having its apex spaced to the opposite side of the valve seat and spaced in said direction from the passage axis, and said surface thus being circular on each of said pair of planes and on every plane between them that is parallel to them, for close fit with said circular edge that provides the valve seat, and the apex of said cone being further so located that in the plane of symmetry of said cone its generatrices are at wedging angles to valve member rotation tangency lines, said tangency lines intersecting the points of contact in said plane of symmetry between the valve member and the valve seat and being respectively normal to imaginary lines in said plane of symmetry that pass through said points of contact and the pivot axis.

2. The butterfly valve of claim 1 wherein said edge that provides the valve seat is convexly rounded on a small radius.

3. The butterfly valve of claim 1 wherein the portion of the valve member that defines said peripheral sealing surface thereof has a substantial hardness, on the order of that of metal, and wherein said land-like means has a slightly greater elastic deformability than said portion of the valve member, further characterized by
   the apex of said cone being spaced from the passage axis by a distance no greater than the radius of the valve seat and no less than the distance between the passage axis and the pivot axis.

4. The butterfly valve of claim 1 wherein the portion of the valve member that defines said peripheral sealing surface thereof has a substantial hardness, on the order of that of metal, and wherein said land-like means has a slightly greater elastic deformability than said portion of the valve member, further characterized by
   the apex of said cone being at a distance from the passage axis which is substantially greater than the distance between the passage axis and the pivot axis and substantially less than the radius of the valve seat.

5. The butterfly valve of claim 1 wherein said wedging angles are substantially equal and are each on the order of 16° to 20°.

6. A butterfly valve comprising a valve housing defining a valve seat which lies in a seat plane and a fluid passage which extends through the valve seat and which has a passage axis normal to said seat plane, said butterfly valve also comprising a disc-like valve member mounted to swing about a pivot axis which is spaced in one direction from said passage axis and which is parallel to said seat plane and spaced to one side thereof, such swinging of the valve member carrying it between a closed position in which it extends across the seat plane and an open position in which it is disposed substantially parallel to the passage axis, said butterfly valve being characterized by:
   A. said valve member having a peripheral sealing surface which extends axially from one to another of a pair of spaced, parallel planes, said surface corresponding to the frustum of an oblique circular cone that is symmetrical to a plane normal to the pivot axis and containing the passage axis, said cone, considering the valve member in its closed position, having its circular base normal to the passage axis and parallel to said pair of parallel planes and having its apex spaced to the opposite side of the seat plane and spaced in said direction from the passage axis, said surface thus being circular on each of said pair of parallel planes and on every plane that is between them and parallel to them, and the apex of said cone being further so located that in the plane of symmetry of said cone its generatrices are at wedging angles to valve member rotation tangency lines, said tangency lines intersecting the points of contact in said plane of symmetry between the valve member and the seat plane and being respectively normal to imaginary lines in said plane of symmetry that pass through said points of contact and the pivot axis; and
   B. said valve seat being provided by a radially inner edge on land-like means in the housing, said edge being circular and concentric to the passage axis for sealing cooperation with said surface on the valve member.

\* \* \* \* \*